(12) United States Patent
Yang et al.

(10) Patent No.: US 11,847,982 B1
(45) Date of Patent: Dec. 19, 2023

(54) BACKLIGHT LED DRIVER CIRCUIT WITH CURRENT REGULATING FUNCTION

(71) Applicant: X-SIGNAL INTEGRATED CO., LTD., Beijing (CN)

(72) Inventors: Guanou Yang, Beijing (CN); Huijiao Jin, Beijing (CN)

(73) Assignee: X-SIGNAL INTEGRATED CO., LTD., Beijing (CN)

( * ) Notice: Subject to any disclaimer, the term of this patent is extended or adjusted under 35 U.S.C. 154(b) by 0 days.

(21) Appl. No.: 18/228,007

(22) Filed: Jul. 31, 2023

Related U.S. Application Data

(63) Continuation of application No. PCT/CN2023/081411, filed on Mar. 14, 2023.

(30) Foreign Application Priority Data

May 13, 2022 (CN) .......................... 202210523916.X

(51) Int. Cl.
*G09G 3/34* (2006.01)
*G09G 3/3283* (2016.01)
*H05B 45/325* (2020.01)
*H05B 45/14* (2020.01)

(52) U.S. Cl.
CPC ..... *G09G 3/3406* (2013.01); *G09G 2330/045* (2013.01)

(58) Field of Classification Search
CPC ...... H05B 45/325; H05B 45/00; H05B 45/14; H05B 45/38; H05B 45/395; H05B 45/46; G09G 2310/027; G09G 3/3283; G09G 2320/043; G09G 2330/12; G09G 3/006; G09G 3/3266; G09G 2300/0861
See application file for complete search history.

(56) References Cited

U.S. PATENT DOCUMENTS

2010/0265271 A1   10/2010   Chang et al.
2012/0127138 A1*  5/2012    Tsuchi ................. G09G 3/3688
                                                            345/204

FOREIGN PATENT DOCUMENTS

CN    2921917 Y    7/2007
CN    104244505 A  12/2014
CN    109102780 A  12/2018
(Continued)

*Primary Examiner* — Wei (Victor) Y Chan
(74) *Attorney, Agent, or Firm* — Bayramoglu Law Offices LLC

(57) ABSTRACT

A backlight LED driver circuit with current regulating function is provided. The backlight LED driver circuit includes: a LED light-emitting element, a first transistor, a first amplifier, a current regulator module, and a voltage regulator module; the current regulator module including a plurality of current channels, each including one second transistor and one third transistor; the voltage regulator module including a fourth transistor, a fifth transistor, and a sixth transistor; the fourth transistor, the fifth transistor, and the sixth transistor in the voltage regulator module and the second transistor and one third transistor of each of the current channels in the current regulator module constitute a current mirror; and the current regulator module further including a decoder configured to generate a signal for controlling on and off states of the plurality of second transistors in the plurality of current channels in response to an input digital control signal.

6 Claims, 2 Drawing Sheets

(56) References Cited

FOREIGN PATENT DOCUMENTS

| | | |
|---|---|---|
| CN | 112233610 A | 1/2021 |
| CN | 113359943 A | 9/2021 |
| CN | 114842808 A | 8/2022 |
| JP | 2010135379 A | 6/2010 |

* cited by examiner

BACKLIGHT LED DRIVER CIRCUIT WITH CURRENT REGULATING FUNCTION

CROSS REFERENCE TO THE RELATED APPLICATIONS

This application is a continuation application of International Application No. PCT/CN2023/081411, filed on Mar. 14, 2023, which is based upon and claims priority to Chinese Patent Application No. 202210523916.X, filed on May 13, 2022, the entire contents of which are incorporated herein by reference.

TECHNICAL FIELD

The present invention relates to the technical field of backlight LED display, in particular, to a backlight LED driver circuit with a current regulating function.

BACKGROUND

With the development of liquid crystal display technology, liquid crystal display technology with the use of a LED as a backlight source has been widely used in current liquid crystal display devices. A traditional driver circuit for LED backlight source, in a case of a low current, has very poor accuracy and even cannot operate normally, and in high brightness applications, requires a high operating voltage. The high operating voltage would cause large power consumption and overheating problems.

As shown in FIG. 1, which is a schematic diagram of a typical backlight LED driver circuit in the prior art, a digital-to-analog converter iDAC receives a digital signal and outputs a current, the current generates a voltage Va at node V1, an amplifier OP1 has a non-inverting input terminal coupled to the voltage Va and an inverting input terminal coupled to the node V2, of which the voltage is defined as Vb. The amplifier OP1 has an output terminal that sends a control signal and is coupled to a gate of a transistor M1 to supply a gate voltage to the transistor M1, so as to control the on and off states of the transistor M1. When the gate voltage supplied is greater than the threshold voltage of the transistor M1, the transistor M1 is turned on to generate a current Iled that flows through the transistor M1 and then LED string lights. Here, the amplifier OP1, the transistor M1, and a resistor R2 forms a negative feedback system in which the voltage Va at node V1 is equal to the voltage Vb at node V2 in steady state. The LED current is equal to Va/R2. Accordingly, altering the output value of the digital-to-analog converter iDAC allows adjustment of the value of the voltage Va at node V1, thereby achieving the function of LED current regulation.

In the above circuit configuration, when the current Iled is low, a very low voltage Va at node V1 is required. In this case, the bias voltage and common-mode noise of the amplifier OP1 can both degrade current accuracy, and the circuit cannot even operate normally at a low current Iled. On the other hand, in a case of a high current Iled, the voltage Vb at node V2 is relatively high, resulting in a relatively high pin voltage VLED of an LED string, which is prone to cause high power state and overheating problems of a LED light emitting device.

It can be seen that there is a need in the prior art for a backlight LED driver circuit that, when a backlight LED is driven, allows precise control of the current through an LED string, and has strong noise immunity and capability of controlling the pin voltage of the LED string.

SUMMARY

A technical object to be realized by the present invention is to improve precise control and noise immunity of a backlight LED driver circuit in a low current state of the LED string, while preventing the overheating problems caused by an excessively high pin voltage of the LED string.

Based on the above technical object, the present invention provides a backlight LED driver circuit with current regulating function, including: a LED light-emitting element, a first transistor, a first amplifier, a current regulator module, and a voltage regulator module; the current regulator module including a plurality of current channels, each including one second transistor and one third transistor; the voltage regulator module including a fourth transistor, a fifth transistor, and a sixth transistor; the fourth transistor, the fifth transistor, and the sixth transistor in the voltage regulator module and the second transistor and one third transistor of each of the current channels in the current regulator module constitute a current mirror;

the voltage regulator module further including a constant current source configured to supply a reference current $I_{ref}$, and each of the current channels having a current value I of: $I = k \times I_{ref}$, where k is a ratio of a width-to-length ratio $W_1/L_1$ of the sixth transistor in the voltage regulator module and a width-to-length ratio $W_2/L_2$ of the third transistor in the respective channel, namely, $k = (W_2/L_2)/(W_1/L_1)$; and the current regulator module further including a decoder configured to generate a signal for controlling on and off states of the plurality of second transistors in the plurality of current channels in response to an input digital control signal.

In one embodiment, the LED light-emitting element 1 is a LED string composed of a plurality of LED light-emitting devices connected in series and having a predetermined arrangement.

In one embodiment, the first transistor includes a drain coupled to a low-voltage terminal pin of the LED light-emitting element, a gate coupled to an output terminal of the first amplifier, and a source coupled to an input terminal of the current regulator module; and the first amplifier includes an inverting input terminal also coupled to the source of the first transistor.

In one embodiment, the second transistor includes a source coupled to a drain of the third transistor, and a drain coupled to the source terminal of the first transistor. A source of the third transistor is grounded; and the gate of each of the second transistors in the plurality of current channels is coupled to a signal output terminal of the decoder.

In one embodiment, a source of the fourth transistor is coupled to a drain of the fifth transistor, a source of the fifth transistor is coupled to a drain of the sixth transistor 53, and a source of the sixth transistor 53 is grounded.

In one embodiment, the voltage regulator module 5 includes a constant voltage source and a second amplifier; and the fourth transistor includes a drain coupled to the constant current source and a gate coupled to an output terminal of the second amplifier, the second amplifier includes a non-inverting input terminal coupled to the constant voltage source and an inverting input terminal coupled to the source of the fourth transistor, and the source of the fourth transistor is also coupled to a non-inverting input terminal of the first amplifier.

In one embodiment, the fourth transistor 51 has a source voltage V1, a voltage at the non-inverting input terminal of the first amplifier 3 is V2, the first transistor 2 has a source voltage V3, and $V_{ref}=V1=V2=V3$.

In one embodiment, the third transistors in the current channels have different width-to-length ratios $W_2/L_2$, so that the current channels have different k values.

In comparison with the prior art, one or more embodiments of the present invention can have the following advantages.

The backlight LED driver circuit of the present invention is configured to control, through the voltage regulator module, the voltage value of the low-voltage terminal pin of the LED light-emitting element, and to realize LED current regulation in a wide range. The backlight LED driver circuit of the present invention can not only ensure the accuracy under low current, but also meet a low voltage of the low-voltage terminal pin of the LED light-emitting element under high current. The linearity and high accuracy of current regulation is thus improved.

Additional features and advantages of the present invention will be set forth in the description which follows, and can in part be apparent from the description, or appreciated by implementation of the invention. The objects and other advantages of the present invention can be realized and attained by the configuration particularly illustrated in the description, claims, and the accompanying drawings.

BRIEF DESCRIPTION OF THE DRAWINGS

The accompanying drawings, which are used to provide a further understanding of the present invention and constitute a part of the description, are used along with the example of the present invention to explain the present invention, and do not constitute a limitation to the present invention. In the accompanying drawings.

DETAILED DESCRIPTION OF THE EMBODIMENTS

In order to clarify the object, technical solution, and advantages of the present invention, the present invention will be further described in detail below in conjunction with the accompanying drawings.

Example

Figure 1:
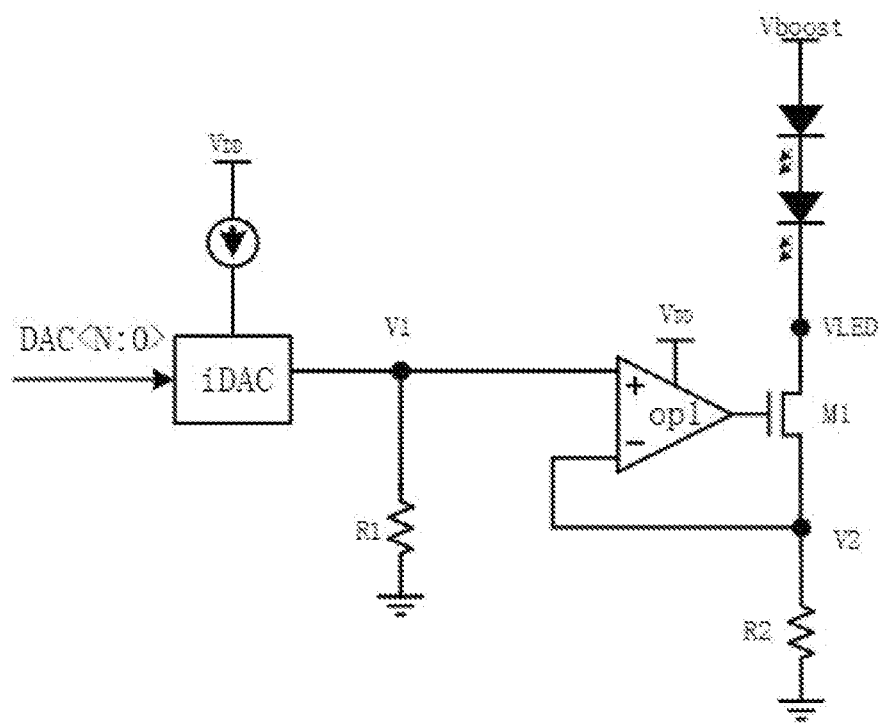
FIG. 1 is a schematic diagram of a backlight LED driver circuit in the prior art.
Figure 2:
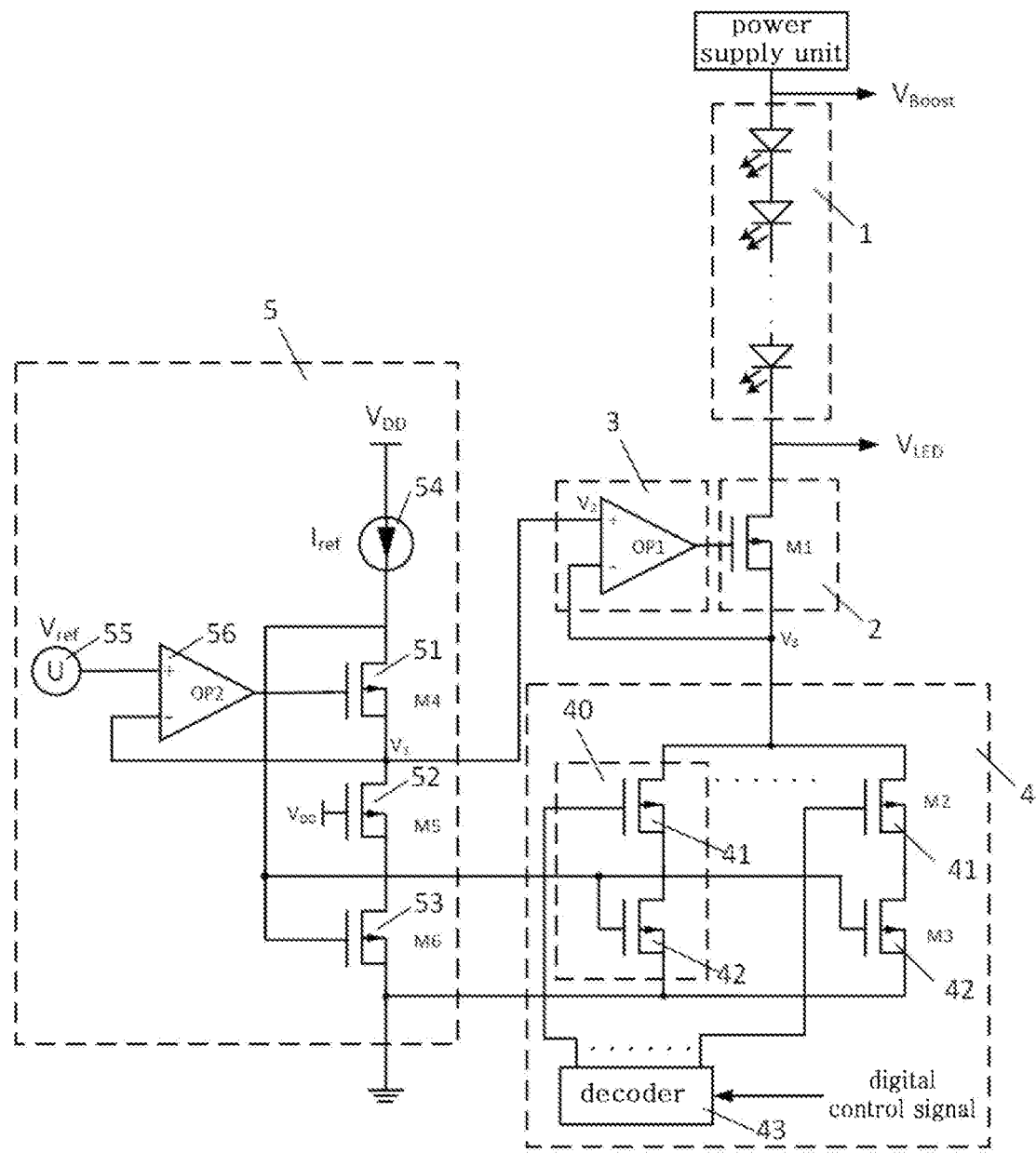
FIG. 2 is a structural schematic diagram of a backlight LED driver circuit in the example of the present invention.

FIG. 2 shows a structural schematic diagram of a backlight LED driver circuit in the present example. The backlight LED driver circuit in the present example includes a LED light-emitting element 1, a first transistor 2, a first amplifier 3, a current regulator module 4, and a voltage regulator module 5. The LED light-emitting element 1 is a LED string composed of a plurality of LED light-emitting devices connected in series and having a predetermined arrangement. The first transistor 2 includes a drain coupled to a low-voltage terminal pin of the LED light-emitting element 1, a gate coupled to an output terminal of the first amplifier 3, and a source coupled to an input terminal of the current regulator module 4; and the first amplifier 3 includes an inverting input terminal also coupled to the source of the first transistor 2.

The current regulator module 4 includes a plurality of current channels 40, each including one second transistor 41 and one third transistor 42. Specifically, the second transistor 41 includes a source coupled to a drain of the third transistor 42, and a drain coupled to the source terminal of the first transistor 2. A source of the third transistor is grounded. The current regulator module 4 further includes a decoder 43, and the gate of each of the second transistors 41 in the plurality of current channels 40 is coupled to a signal output terminal of the decoder 43.

The voltage regulator module 5 includes a fourth transistor 51, a fifth transistor 52, and a sixth transistor 53. Specifically, a source of the fourth transistor 51 is coupled to a drain of the fifth transistor 52, a source of the fifth transistor 52 is coupled to a drain of the sixth transistor 53, and a source of the sixth transistor 53 is grounded. The voltage regulator module 5 includes a constant current source 54, a constant voltage source 55, and a second amplifier 56. The fourth transistor 51 includes a drain coupled to the constant current source 54 and a gate coupled to an output terminal of the second amplifier 56. The second amplifier 56 includes a non-inverting input terminal coupled to the constant voltage source 55 and an inverting input terminal coupled to the source of the fourth transistor 51, and the source of the fourth transistor 51 is also coupled to a non-inverting input terminal of the first amplifier 3.

A gate of the fifth transistor 52 is coupled to an external voltage VDD, and a gate of the sixth transistor 53 is coupled to a drain of the fourth transistor 51.

The voltage regulator module 5 is configured to supply, from the constant current source 54, a reference current $I_{ref}$, which is connected to a circuit composed of the fourth transistor 51, the fifth transistor 52, and the sixth transistor 53. The second amplifier 56 includes a non-inverting input terminal coupled to a reference voltage V f. The fifth transistor 52 serving as the switch of the fourth transistor 51 and the sixth transistor 53, is in a normally open state under the action of the external voltage VDD. If the source voltage of the fourth transistor 51 is V1, the voltage at the non-inverting input terminal of the first amplifier 3 is V2, and the source voltage of the first transistor 2 is V3, then it is found, according to the characteristics of the amplifier, that the voltage value $V_{ref}=V1=V2=V3$. In the present example, $V_{ref}$ is set to be a relatively low constant voltage, such as 100 mv. From the above voltage relationship, it can be seen that the voltage value of the low-voltage terminal pin of the LED light-emitting element is controlled by the reference voltage $V_{ref}$, which thus prevents the heat generation problem resulting from an excessively high pin voltage.

Hence, the sixth transistor 53 and the third transistor 42 both operate in the linear region. The fourth transistor 51, the fifth transistor 52, and the sixth transistor 53, along with the second transistor 41 and one third transistor 42, form a current mirror circuit. Accordingly, the current value I of each current channel can be expressed as $I=k \times I_{ref}$, where k is a ratio of a width-to-length ratio $W_1/L_1$ of the sixth transistor and a width-to-length ratio $W_2/L_2$ of the third transistor 42, namely, $k=(W_2/L_2)/(W_1/L_1)$. When M current channels 40 are present, the third transistors 42 in the current channels 40 may have different k value by setting different width-to-length ratio $W_2/L_2$. Namely, the current values of the M current channels 40 in the current regulator module 4 can be expressed as: $k_1 \times I_{ref}, k_2 \times I_{ref}, \ldots, k_M \times I_{ref}$.

The decoder 43 receives an input digital control signal DAC<N:0> and generates a multi-channel control signal 10SW<M:0>. Likewise, when the current regulator module 4 includes M+1 current channels 40, each control signal of M control signals SW<M:0> is correspondingly transmitted to the gate of the third transistor 41 of a current channel 40 for controlling the on and off state of the current channel 40.

For example, when the digital control signal DAC<N:0> is a 3-bit binary signal, that is, the binary value range of the digital control signal is 000~111, then $2^3=8$ kinds of decoded outputs can be obtained through the decoder 43. The corresponding output truth table is listed in Table 1. The on and off of each current channel 40 can be controlled according to its output value.

TABLE 1

| DAC<N:0> input | SW<M:0> output |
|---|---|
| 000 | 00000000 |
| 001 | 00000001 |
| 010 | 00000011 |
| 011 | 00000111 |
| 100 | 00001111 |
| 101 | 00011111 |
| 110 | 00111111 |
| 111 | 01111111 |

For example, when the DAC<N:0> input is 011, the corresponding SW<M:0> output is 00000111, and the corresponding current channels $M_1$, $M_2$, and $M_3$ are turned on. The current $I_{LED}$ flowing through the LED light-emitting element 1 is:

$$I_{LED}=(k_1+k_2+k_3)\times I_{ref}$$

The different DAC<N:0> inputs result in different current values $I_{LED}$, thereby controlling the brightness of the LED string. The backlight LED driver circuit of the present invention is configured to control, through the voltage regulator module 5, the voltage value of the low-voltage terminal pin of the LED light-emitting element, and to realize LED current regulation in a wide range. The backlight LED driver circuit of the present invention can not only ensure the accuracy under low current, but also meet a low voltage of the low-voltage terminal pin of the LED light-emitting element under high current. The linearity and high accuracy of current regulation is thus improved.

The above description is merely a specific implementation of the present invention, and the protective scope of the present invention is not limited thereto. The modification or substitution made by any skilled person in the art in the technical specification described in the present invention should fall within the protective scope of the present invention.

What is claimed is:

1. A backlight LED driver circuit with current regulating function, comprising: a LED light-emitting element, a first transistor, a first amplifier, a current regulator module, and a voltage regulator module;

the current regulator module comprises a plurality of current channels, each comprising one second transistor and one third transistor; the voltage regulator module comprises a fourth transistor, a fifth transistor, and a sixth transistor; the fourth transistor, the fifth transistor, and the sixth transistor in the voltage regulator module and the second transistor and one third transistor of each of the current channels in the current regulator module constitute a current mirror;

a source of the fourth transistor is coupled to a drain of the fifth transistor, a source of the fifth transistor is coupled to a drain of the sixth transistor, and a source of the sixth transistor is grounded, the voltage regulator module comprises a constant voltage source and a second amplifier; and the fourth transistor comprises a drain coupled to a constant current source and a gate coupled to an output terminal of the second amplifier, the second amplifier comprises a non-inverting input terminal coupled to the constant voltage source and an inverting input terminal coupled to the source of the fourth transistor, and the source of the fourth transistor is further coupled to a non-inverting input terminal of the first amplifier, the fifth transistor serving as a switch of the fourth transistor and the sixth transistor, is in a normally open state under an action of an external voltage, a voltage value of a low-voltage terminal pin of the LED light-emitting element is controlled by a reference voltage $V_{ref}$, which thus prevents a heat generation problem resulting from an excessively high pin voltage, the voltage regulator module further comprises a constant current source configured to supply a reference current $I_{ref}$, and each of the current channels having a current value I of: $I=k\times I_{ref}$, where k is a ratio of a width-to-length ratio $W_1/L_1$ of the sixth transistor in the voltage regulator module and a width-to-length ratio $W_2/L_2$ of the third transistor in the respective channel, namely, $k=W_2/L_2)/(W_1/L_1)$; and the current regulator module further comprises a decoder configured to generate a signal for controlling on and off states of the plurality of second transistors in the plurality of current channels in response to an input digital control signal.

2. The backlight LED driver circuit according to claim 1, wherein the LED light-emitting element is a LED string composed of a plurality of LED light-emitting devices connected in series and having a predetermined arrangement.

3. The backlight LED driver circuit according to claim 1, wherein the first transistor comprises a drain coupled to a low-voltage terminal pin of the LED fight-emitting element, a gate coupled to an output terminal of the first amplifier, and a source coupled to an input terminal of the current regulator module; and the first amplifier comprises an inverting input terminal further coupled to the source of the first transistor.

4. The backlight LED driver circuit according to claim 1, wherein the second transistor comprises a source coupled to a drain of the third transistor, and a drain coupled to the source terminal of the first transistor; a source of the third transistor is grounded; and a gate of each of the second transistors in the plurality of current channels is coupled to a signal output terminal of the decoder.

5. The backlight LED driver circuit according to claim 1, wherein the fourth transistor has a source voltage V1, a voltage at the non-inverting input terminal of the first amplifier is V2, the first transistor has a source voltage V3, and $V_{ref}=V1=V2=V3$.

6. The backlight LED driver circuit according to claim 1, wherein the third transistors in the different current channels have different width-to-length ratios $W_2/L_2$, so that, the different current channels have different k values.

* * * * *